United States Patent [19]

Wu

[11] Patent Number: 4,532,608

[45] Date of Patent: Jul. 30, 1985

[54] MEMORY DEVICE

[76] Inventor: Jiun-Tsong Wu, 446 Manzanita Ave., Sierra Madre, Calif. 91024

[21] Appl. No.: 392,147

[22] Filed: Jun. 25, 1982

[51] Int. Cl.³ ............................................. G11C 13/00
[52] U.S. Cl. ..................................... 365/127; 365/120
[58] Field of Search ............... 365/120, 127, 124, 121, 365/122

[56] References Cited

U.S. PATENT DOCUMENTS

| | | | |
|---|---|---|---|
| 3,286,025 | 11/1966 | Ingersoll | 365/127 |
| 3,668,663 | 6/1972 | Chandross et al. | 365/107 |
| 3,715,734 | 2/1973 | Fajans | 365/127 |
| 3,977,009 | 8/1976 | Ohtsuka et al. | 365/107 |
| 4,126,854 | 11/1978 | Sheridon | 365/127 |
| 4,183,094 | 1/1980 | Keezer et al. | 365/127 |
| 4,288,861 | 9/1981 | Swainson et al. | 365/127 |
| 4,425,570 | 1/1984 | Bell et al. | 365/127 |

Primary Examiner—Terrell W. Fears
Attorney, Agent, or Firm—Edward J. DaRin

[57] ABSTRACT

An information storage and retrieval system has a storage medium, a read device and a write device. The system uses light to transmit signals between the storage medium and the read, the write devices. And it is capable of both read and write operations. The storage medium has a substrate with a number of cells of empty spaces in it. The cell has an ablative material deposited on its wall. The pattern of distribution determines the information stored. To read an information, a light beam is directed towards a cell and the transmitted light is detected by a sensor. To write an information, the ablative material is vaporized and redistributed inside the cell by high intensity light beam. The storage medium can also be used to store visual images directly by having cells and pigment plates arranged regularly in a substrate.

20 Claims, 7 Drawing Figures

MEMORY DEVICE

This invention relates to information storage and retrieval. It is an object of this invention to disclose a memory device which is capable of both read and write operations using light as signal transmitter. The invention has two forms. In the first form of the invention the memory device is used for information of general purpose. It is applicable to computer memory and video disk. In the second form of the invention, the device is used to store pictures or visual images which can be viewed by human eyes directly.

The first form of this invention is disclosed as follows:

The memory system comprises a storage medium, a read device, and a write device. Light is used to transmit signals between the storage medium and the read or the write device. The read device includes a light source, a light sensor, and necessary optical apparatus to deflect and focus a light beam on the storage medium. The write device includes a light source and necessary optical apparatus to deflect and focus a light beam on the storage medium. The read and write devices may share some common parts. The light source is preferably a laser. The wavelength of the light is chosen to be compatible with the storage medium. The storage medium is made of a substrate which is transparent to the light beam from the read device and the write device. Examples of substrate materials are plastics and glasses. A number of cells, or bubbles, with empty spaces of certain shape, are embedded in the substrate. The space inside the cell is filled with a gas or is in vacumm. A certain amount of ablative material is deposited on the wall of the cell. The ablative material is opaque to the light beam from the read device amd the write device. Examples of the ablative materials are sodium, potassium, zinc, sulfur, phosphorus, iodine and ammonium chloride. The ablative material can be vaporized by a high intensity light beam from the write device. The substrate may be made in the shape of a disk, a drum, a slide, or a tape. The disk is spun by a disk drive and the tape mounted on a tape drive.

To read or write a particular cell, a light beam must be directed towards the cell. The selection of the cell is done by moving the storage medium to the proper position or by deflection or switching of the light beam to the desirable location. For example, the substrate may be a disk that spins under a read or write head, or a tape that is pulled through a read or write head. Alternatively, the substrate may be a slide and a light beam is deflected and focus on certain location of the slide.

Each cell in the substrate is capable of storing one bit or more of digital information. It can also store analog information. The distribution of the ablative material on the cell wall determines the content of the information stored. During a read operation, a low intensity light beam is directed towards the cell to detect the pattern of distribution of the ablative material. During a write operation, a high intensity light beam is directed towards the cell to vaporize and redistrubute the ablative material.

Figure 1:
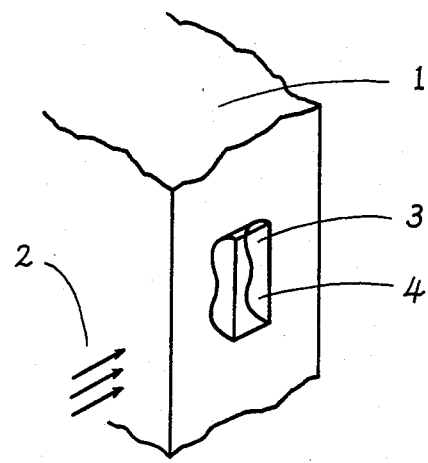
FIG. 1 shows a first embodiment of the invention as a binary information storage device.

Many different embodiments of this form of invention are possible. Four preferred embodiments are described as follows:

In one embodiment of the invention, a cell is used to store one bit of information. The cell is made in an elongated shape with its middle slightly constricted. When a bit of information is stored, one end of the cell has the ablative material covering its wall and the other end is clear of the ablative material. A binary one or zero is stored depending on which end is covered or cleared. To read the information, a low intensity light beam is directed towards one particular end of the cell. A light sensor downstream of the light beam is used to detect the content of the information. To change the content of the information previusly stored, a high intensity light beam is directed towards the end covered with ablative material. The light beam is of sufficient intensity so that the ablative material is vaporized. The vaporized material diffuses to the other end and is then allowed to cool down and deposit on its wall. As a result, a binary zero is changed to a one or vice versa. FIG. 1 illustrates such an embodiment. A substrate 1 is made as a slide. A cut on the slide exposes one half of a cell. The cell has two ends 3 and 4 joined by a narrower section. The two ends represent the numbers 0 and 1. If the end 3 is clear and the end 4 is covered, the number 0 is stored. If the end 4 is clear and the end 3 is covered, the number 1 is stored. A light beam 2 is shown directed towards the lower end of the cell.

Figure 2:
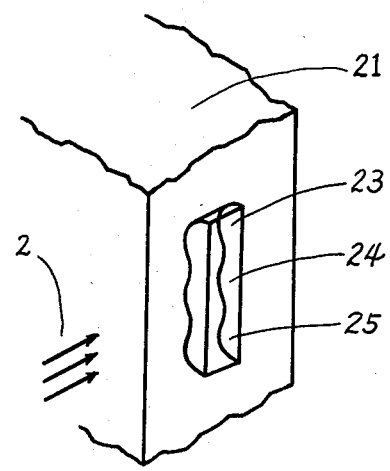
FIG. 2 shows an alternative embodiment having a storage capacity of more than one bit.

In a second embodiment of the invention, a cell may be used to store more than one bit of digital information. The cell will be in the shape of a long rod. The rod is divided into several portions. The rod is slightly constricted between two neighboring portions. When an information, or a number, is stored, every portion except one is covered with the ablative material. The portion that is clear of the ablative material represents the information stored. During a read operation, a light beam scans through the whole length of the cell and a light sensor downstream detects which portion is clear of the ablative material. Alternatively, several light beams can be directed towards different portions of the cell simultaneously and a corresponding number of light sensors is used to detect which portion is clear of the ablative material. During a write operation, a wide beam of light is directed towards the whole length of the cell. The light beam covers the entire cell and has enough intensity to vaporize all the ablative material in the cell. The light beam is then turned off to allow the vaporized material to cool down and deosit uniformly on the cell wall. Thus the old information is erased. New information can subsequently be written by passing a high intensity light beam on a particular portion of the cell. The light beam vaporizes the ablative material in that portion and forces the material to deposit in other parts of the cell. FIG. 2 illustrates such an embodiment. A substrate 21 is made as a slide. A cut on the slide exposes one half of a cell. The cell is divided into three portions 23, 24 and 25. Each portion is used to represent one of three distinct numbers. For example, they can be used to represent the number 0, 1 and 2. A light beam 2 is shown directed towards the portion 24 of the cell.

Figure 3:
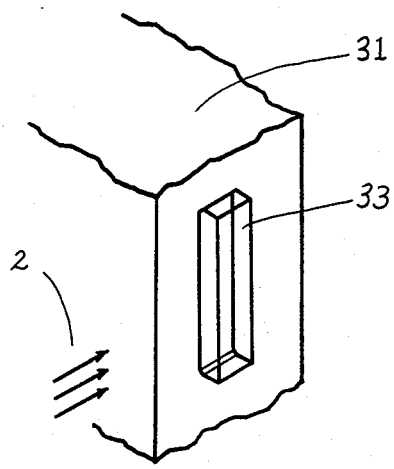
FIG. 3 shows an analog information storage device.

In a third embodiment of the invention, a cell is used to store analog information. The cell is made in the shape of a rod with a uniform width. The information is read and written in a similar fashion as in the second embodiment of this form of the invention. However, the cell is not divided into a discrete number of portions. When information is stored, the whole length of the cell is covered with the ablative material except a small spot. The location of the clear spot represents the information stored. During a read operation the location of the clear spot is sensed by a light beam scanning through the length of the cell. During a write operation, the old information is erased by simultaneously vaporizing all the ablative material in the cell and then allowing it to cool down and deposit uniformly on the wall. A new information is subsequently written by directing an intense light beam towards certain spot in the cell to remove the ablative material at that spot. FIG. 3 illustrates such an embodiment. a substrate 31 is made as a slide. A cut on the slide exposes one half of a cell 33. A light beam 2 is shown directed towards a spot on the cell. The distance of a clear spot from the bottom of the cell represents the analog information stored.

In a fourth embodiment of the invention, a cell similar to the one in the third embodiment is used. But the analog information is stored in a different way. A portion of the cell on one end is covered with the ablative material. The rest of the cell is clear of the ablative material. The boundary between the two portions is used to represent the information. To read this information, a wide beam of light is directed towards the entire cell. The amount of light that passes through is sensed. The amount is proportional to the length of the portion of the cell clear of the ablative material. To write the information, a wide beam of light is directed towards the cell to distribute the ablative material uniformly in the cell. Aother beam is subsequently directed towards a portion of the cell on one end to clear that portion of the ablative material. The boundary between the two portions is used to represent the information written.

Figure 4:
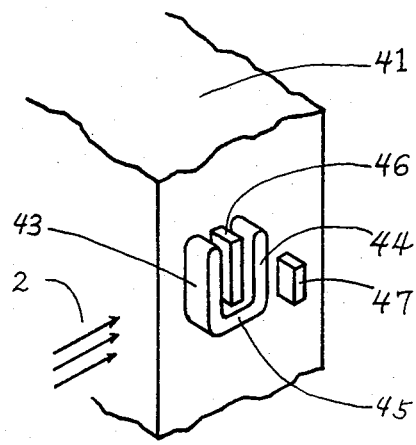
FIGS. 4–7 image type information storage devices.

The second form of the invention is disclosed as follows:

In this form of the invention, the storage medium is used to store a visual image which can be viewed by human eyes directly. The image may be in colors or in black and white. The image is broken up into very small dots of various colors and shades, in a manner similar to that of a printed halftone image or a color television picture. The substrate is made as a slide which is viewed from its front. It has arrays of cells of empty spaces and pigment plates arranged in a regular pattern. The cells and the pigment plates together represent dots on the image. Each cell has one or more pigment plates near it. The space inside the cell is in vacuum or is gas filled. A certain amount of ablative material is deposited on the cell wall. The color and shade of the ablative material are different from those of the pigment plate of the same cell. Each cell has a forward portion and a storage portion. The ablative material can be moved between the forward portion and the storage portion by a high intensity light beam. The wave length of the light used during a write operation is chosen so that the light is easily absorbed by the ablative material but not by the pigment plate. The forward portion is in front of a pigment plate so that the pigment plate is covered if the ablative material is deposited on its wall. The storage portion stores the ablative material and is arranged in a location and direction to give the stored ablative material minimal visibility. The shape of the cell and the arrangement of the pigment plate may be different from one embodiment to another. Furthermore, more than one cell can be arranged with their forward portions in front of a pigment plate in an overlapping way. Four preferred embodiments will be described as follows:

FIG. 4 shows the first embodiment. Each cell in a substrate 41 has two portions, a forward portion 43, and a storage portion 44. The two portions are connected by a neck 45. The forward portion 43 is close to the front surface of the slide and the storage portion 44 is near the back side of the slide. Looking from one edge of the slide, the cell has a U-shape cross section. Between the two portions of the cell, a pigment plate 46 is embedded in the substrate. Another plate 47 is embedded behind the neck 45 of the cell. The pigment plate is used for direct viewing when it is uncovered and also for stopping and reflecting the light beam during a write operation. A certain amount of ablative material is deposited on the cell wall. The ablative material may be moved from one portion of the cell to the other by a high intensity light beam. A high intensity light beam 2 coming from the front of the slide, and directed towards the forward portion 43 and the neck 45 of the cell will be stopped and reflected by pigment plates 46 and 47. The ablative materials in the forward portion 43 and the neck 45 are then vaporized and allowed to be deposited in the storage portion 44. If the light beam is directed towards only part of the forward portion 43, then forward portion 43 remains partially covered with the ablative material. Similarly, directing a high intensity beam of light from the back of the slide and towards the storage portion 44 of the cell will move the ablative material to the forward portion and the neck. Thus the pigment plate of a particular cell may be covered or uncovered, in part or in whole, by the ablative material when it is viewed from the front of the slide. This arrangement of the cell and the pigment plates together represents a dot on the image.

On the slide, pigment plates of different colors and shades and ablative material of different colors and shades can be arranged in a regular pattern. Lights of different wave lengths can be used by the write device to move the ablative materials in the cells. By choosing the colors and shades of the pigments and the ablative materail properly, and by covering and uncovering the pigment plates of the cells in certain pattern, an image can be formed on the slide. This image can be viewed directly by human eyes. The image can also be read by a read device. The read device directs a light beam towards the forward poriton of the cell. Part of the light beam is reflected by the ablative material in the cell and the pigment behind the forward portion. The intensity and color of the reflected light depends on the distribution of the ablative material in the forward portion. The reflected light is detected by a sensor in the read device. The sensed color and intensity can be used to duplicate the picture with a write device. Thus the image can be duplicated easily by a machine.

Figure 5:
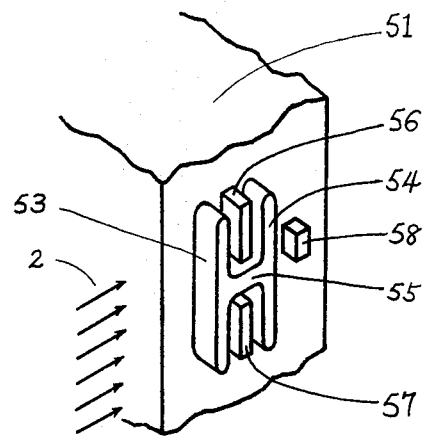

In another embodiment of the invention, the storage medium is similar to the one shown in FIG. 4. However, the shape of the cell is different. It has an H-shape cross section. FIG. 5 shows such an embodiment. A substrate 51 has a cell in it. The cell has a forward portion 53 and a storage portion 54. The two portions are connected by a neck 55. Two pigment plates 56 and 57 are located between the two portions 53 and 54. Another pigment plate 58 is located behind the neck 55. Light beam 2 is shown directed towards the forward portion 53 and the neck 55. This arrangement of the cell and the pigment plates together represents a dot a on the image. The mode of operation of the storage medium and the read, write devices for it, is similar to that of FIG. 4.

Figure 6:
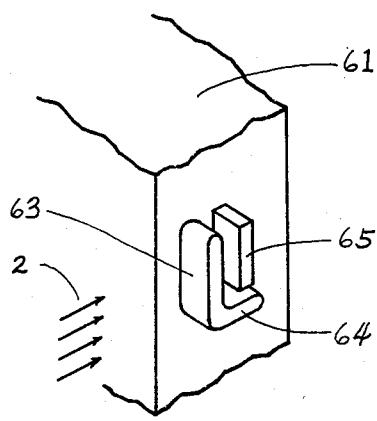

FIG. 6 shows still another embodiment of the invention. A substrate 61 has a cell in it. Each cell has two portions, a forward portion 63, and a storage portion 64. The forward portion 63 is close to the front surface of the slide and a pigment plate is embedded behind it. The storage portion 64 locating beside the pigment plate is connected to the forward portion 63. Looking from one edge of the slide, the cell has an L-shape cross section. The pigment plate is used for direct viewing when it is uncovered and also for stopping reflecting the light beam during a write operation. A certain amount of ablative material is deposited on the cell wall. The ablative material may be moved form one portion of the cell to the other by high intensity beam. A light beam 2 coming from the front of the slide, and directed towards the forward portion of the cell will be stopped by the pigment plate 65. The ablative material in the forward portion 63 is then vaporized and allowed to be deposited in the storage portion 64. If the light beam is directed towards only part of the forward portion 63, the forward portion remains partially covered with the ablative material. Similarly, directing a high intensity beam of light from the front of the slide and towards the storage portion 64 of the cell will move the ablative material to the forward portion 63. Thus the pigment plate of a particular cell may be covered or uncovered, in part or in whole, by the ablative material when it is viewed from the front of the slide. This arrangement of the cell and the pigment plates together represents a dot on the image.

Figure 7:
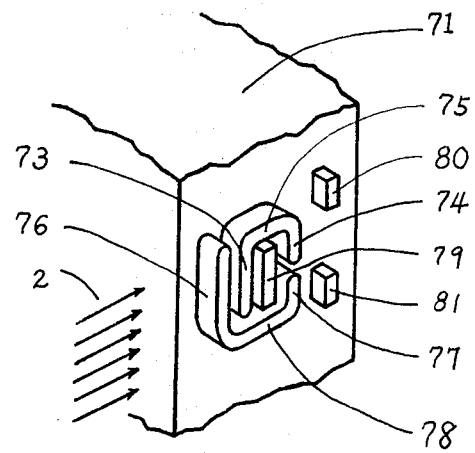

FIG. 7 shows a slide of substrate 71. The substrate 71 has two cells. The first cell has a front portion 73, a storage portion 74, and a neck 75. The second cell has a front portion 76, a storage portion 77, and a neck 78. A pigment plate 79 is behind the portions 73 and 76. Two more pigment plates 80 and 81 are behind the neck 75 and the neck 78 respectively. The two front portions 73 and 76 are overlapping in front of the pigment plate 79. A light beam 2 is shown directed towards portions 73, 76 and necks 75, 78. The three pigment plates are all of a same color which is chosen to be represented by the two cells. The ablative material in the first cell is white. The ablative material in the second cell is black. Both materials can be moved in the cells by high intensity light beams of suitable wave lengths. To move the material from the front portion and neck to the storage portion, the light beam is directed from the front of the slide. To move the material from the storage portion to the front portion and the neck, the light beam 2 is directed from behind the slide. This arrangement of cells and pigment plates together represents a dot of a particular color on the image. The dot can display the color of the pigment plate, or black, or white. The provision of two cells permits greater contrast for the image.

I claim:

1. In a memory system including a storage medium, a read device, and a write device; said memory system characterized in that light is used to transmit signals, the improvement in which said storage medium comprises a light transparent substrate with a plurality of cells in it, each of said cells having an empty space and having a preselected amount of ablative material deposited on a wall of said sapce at a preselected area within the cell along with a clear area for representing coded data in accordance with the relative locations of the areas covered by the ablative material and the clear area, and said ablative material is opaque to said light and vaporizable by a high intensity light beam to cause the ablative material to be redeposited on another location within the cell to thereby form a clear area thereat and to change the relative locations of the areas covered by the ablative material and the clear areas for representing different coded data, and wherein the read device of the memory system has a light sensor and means to direct a beam of light towards a selected cell in order to detect the relative locations of said ablative material covered areas and the clear area in said cell, and that the write device of the system has means to direct a beam of high intensity light towards a selected cell in order to change the relative locations of said ablative material in said cell by vaporizing said ablative material and causing the material to be redeposited at another area and defining another clear area at the vaporized area.

2. In a memory system for direct storage of visual images wherein said system includes a storage medium a read device, and a write device, and said system characterized in that light is used to transmit signals, the improvement in which the storage medium comprises a transparent substrate with a plurality of cells comprising an empty space with a pigment plate embedded in said substrate at each of said cells, and that each of said cells has a clear space and has a preselected amount of ablative material deposited at preselected locations, the ablative material being opaque to light and vaporizable to form a clear area so as to be redeposited at another area to cover or uncover the pigment plate in part or as a whole for defining a dot of a visible image on the cell wall, and that each of said cells has a forward portion and a storage portion, with the forward portion in front of said pigment plate such that the ablative material deposited in said forward portion visually covers said pigment plate, and with the storage portion arranged in a location and direction such that the ablative material deposited in said storage portion has minimal visibility, wherein the read device of the system has light sensors and means to direct a beam of light towards a selected cell in order to detect the relative locations of the ablative material covered areas and clear areas in said cell, and that the write device of the system has means to direct a beam of light toward a selected cell in order to change the relative locations in the cell of said ablative material covered areas and the clear areas in said cell by vaporizing said ablative material and defining a clear area thereat and redepositing the ablative material at another area in the cell.

3. A memory device for a radiant energy information storage system comprising a body of radiant energy transparent material having a plurality of generally void information storage cells therein, and ablative material deposited on a preselected area within the void information cells along with a clear area for representing coded information in accordance with the relative locations of the areas covered by the ablative material and the clear area, said ablative material being opaque to said radiant energy and being vaporizable in response to a high intensity radiant energy beam to cause the ablative material to become vaporized for forming a clear area thereat and to be redeposited at another location within the cell to thereby change the relative locations of the areas covered by the ablative material and the clear area to thereby change the information stored in the storage cell.

4. A memory device in accordance with claim 3 wherein said generally void cells are elongated in one direction whereby one portion of the elongated cell may be irradiated causing the ablative material deposited thereon to be vaporized form said one portion and redeposited on another portion to indicate a change of the information stored in the memory.

5. The combination in accordance with claim 4 wherein said elongated cell contains a restricted region between two portions thereof to further define the portions thereof.

6. The combination in accordance with claim 5 including at least two restricted regions whereby said cell contains at least three portions whereby said cell may be changed to store three different pieces of information in accordance with the relative locations of the clear area and the ablative material covered area.

7. The combination in accordance with claim 3 wherein said cell is in the form of a U.

8. The combination in accordance with claim 7 including a pigment plate positioned between the legs of the U whereby the pigment plate is visible or invisible when viewed through a leg of the U depending upon the presence or absence of ablative material on the boundary of the cell defining said leg of the U.

9. The combination in accordance with claim 7 including a radiation blocking member between the legs of the U whereby ablative material may be moved from one leg to the other by the radiation of a leg having ablative material on the boundary walls thereof.

10. The combination in accordance with claim 3 wherein said cell is generally L shaped including a body and a foot portion.

11. The combination in accordance with claim 10 including radiation blocking means adjacent to one of said body and foot portions opposite the direction of radiant energy.

12. The combination in accordance with claim 11 wherein said radiation blocking means is a pigment plate which is visible only when ablative material is absent from the portion adjacent to said pigment plate.

13. The combination in accordance with claim 3 wherein said memory cell is generally H shaped.

14. The combination in accordance with claim 13 including radiation blocking means between the legs of the H.

15. The combination in accordance with claim 14 including additional radiation blocking means adjacent to the neck of the H shaped cell.

16. The combination in accordance with claim 3 wherein said memory cell includes a pair of superimposed spaced voids.

17. The combination in accordance with claim 16 wherein said superimposed voids are defined by a pair of interleaved U shaped members.

18. The combination in accordance with claim 17 including radiation blocking means positioned between the superimposed spaced voids and the remainder of voids.

19. A memory device for a light beam radiation actuated information storage and retrieval system comprising a substrate of material transparent to light radiation of the type used for storage and retrieval of information in said system; said substrate defining a plurality of discrete generally void volumes therein; a quantity of material opaque to said light radiation in each of said voids; said material being vaporizable and movable on the walls of the substrate defining said void volumes responsive to incident radition; said material being ablated responsive to the light beam radiation directed to a localized area of the wall surface of a void to cause the ablative material to be vaporized and define a clear area and to be moved to another location of the void volume to change the relative locations of the ablative material and the clear area and thereby the information stored in the void volume; and said material being responsive to light radiation in the wall area of the void for reablating the material to generally restore the original locations of the ablative material and clear area on the walls of the void volume.

20. A memory device for a light beam radiation actuated information storage and retrieval system comprising a substrate material transparent to light radiation of the type used for storage and retrieval of information in said system; said substrate defining a plurality of discrete generally void volumes including at least two definable regions therein, a quantity of material opaque to said light radiation in each of said voids; said material being ablated responsive to radiation of a light beam directed toward one of said regions of a void volume having said material deposited thereon for representing coded data and being vaporizable for substantially eliminating the presence of ablative material at said one region for representing different coded data; said cell being responsive to light radiation on substantially the entire void for vaporizing said material and redepositing the material generally uniformly on the entire wall of said void to define different coded data; and said material being responsive to light radiation in the wall area of the void for re-vaporizing the material to generally restore the original locations of the ablative material at said one region on the wall of the void volume.

* * * * *

UNITED STATES PATENT AND TRADEMARK OFFICE
CERTIFICATE OF CORRECTION

PATENT NO. : 4,532,608

DATED : July 30, 1985

INVENTOR(S): Jiun-Tsong Wu

It is certified that error appears in the above-identified patent and that said Letters Patent is hereby corrected as shown below:

```
Column 1, line 35, change "amd" to -- and --;
Column 2, line 1, after "7" insert -- show --;
Column 2, line 16, change "previusly" to -- previously --;

Column 2, line 51, change "deosit" to -- deposit --;
Column 3, line 15, change "a" (first occurrence) to -- A--;
Column 3, line 33, change "Aother" to -- Another --;
Column 4, line 25, after "then" insert -- the --;
Column 4, line 43, change "materail" to -- material --;
Column 4, line 68, delete "a" (second occurrence);
Column 5, line 12, after "stopping" insert -- and --;
Column 5, line 15, change "form" to -- from --;
Column 5, line 65, change "sapce" to -- space --;
Column 6, line 19, after "medium" insert -- , --;
Column 7, line 3, change "form" to -- from --.
```

Signed and Sealed this

Seventh Day of January 1986

[SEAL]

Attest:

DONALD J. QUIGG

Attesting Officer

Commissioner of Patents and Trademarks